Patented Apr. 27, 1937

2,078,442

UNITED STATES PATENT OFFICE 2,078,442

SOLVENT REFINING OF MINERAL OIL

Louis A. Clarke, Fishkill, N. Y., assignor to The Texas Company, New York, N. Y., a corporation of Delaware No Drawing. Application August 29, 1935, Serial No. 38,406

2 Claims. (Cl. 196—13)

This invention relates to refining hydrocarbon oil, and more particularly to refining mineral oil by solvent extraction.

The invention broadly contemplates refining mineral oil with a selective solvent to remove undesired constituents and to produce therefrom refined products having desired characteristics.

The invention has particular reference to the treatment of mineral oil with a solvent selected from the alkoxy derivatives of aliphatic esters, such as methoxy and ethoxy methyl and ethyl acetates, for example. These compounds may be represented by the following structural formula where $R^1$, $R^2$ and $R^3$ represent methyl, ethyl, or propyl groups, and preferably where there are no more than two propyl groups in the compound:

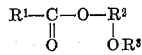

The following specific compounds of the foregoing class may be mentioned as being particularly useful as solvents in the solvent refining of mineral lubricating oil for the manufacture of lubricating oil products characterized by high viscosity index:

Methoxy methyl acetate_____$CH_3COOCH_2OCH_3$
Ethoxy methyl acetate_____$CH_3COOCH_2OC_2H_5$
Beta methoxy ethyl acetate_____$CH_3COOCH_2CH_2OCH_3$
Beta ethoxy ethyl acetate_$CH_3COOCH_2CH_2OC_2H_5$ I have found that these solvent liquids, when mixed with lubricating oil stock, under suitable conditions of temperature and solvent to oil, effect separation of the oil into so-called paraffinic and non-paraffinic portions. The non-paraffinic portion comprises relatively low viscosity index constituents of the oil, such as naphthenic, aromatic and unsaturated hydrocarbon bodies, while the paraffinic portion comprises relatively high viscosity index constituents.

In treating lubricating oil stock with the solvent liquid of my invention for the production of high viscosity index lubricating oil, one part of oil is mixed with from one to about four parts of solvent liquid at a temperature of from 30° to 200° F. This mixture, after thorough agitation, is separated into extract and raffinate phases.

The extract phase which comprises relatively low viscosity index constituents of the oil dissolves in the bulk of the solvent liquid, while the raffinate phase comprises the high viscosity index constituents of the oil mixed with some of the solvent liquid.

The two phases are separated and the solvent liquid removed therefrom either by distillation or by using a suitable solvent wash liquid. The temperature, as well as the ratio of solvent to oil employed in carrying out the extraction treatment, may be varied for the purpose of effecting the particular degree of extraction desired and will, of course, also depend on the nature of the oil undergoing treatment.

By way of a specific example, untreated dewaxed lubricating oil distillate derived from Mid-Continent crude was extracted with beta ethoxy ethyl acetate in a batch type of operation. This lubricating distillate had tests as indicated below.

One part of the above oil was extracted with two parts of the solvent liquid at a temperature of 77° F. The mixture was separated into extract and raffinate phases and the solvent liquid was recovered therefrom by distillation. The resulting raffinate oil had the following tests as compared with the oil before extraction.

| | Raffinate | Charge |
|---|---|---|
| Gravity °A. P. I. | 25.5 | 21.3 |
| S. U. vis. @ 100° F | 819 | 1236 |
| S. U. vis. @ 210° F | 72 | 80.5 |
| Viscosity index | 72 | 51 |
| Carbon residue percent | .31 | .69 |

The yield of raffinate oil amounted to about 55% of the original oil charged and, as indicated above, had a viscosity index of 72 as compared with a viscosity index of 51 for the original oil before extraction.

In some instances, it may be of advantage to carry out the extraction in the presence of a modifying solvent liquid such as benzol, a light petroleum fraction such as naphtha, or a petroleum fraction comprising mostly gaseous hydrocarbons such as propane.

The lubricating oil distillate may be subjected to extractive treatment, either before or after dewaxing, and either before or after treatment with other solvents or chemicals.

Furthermore, the invention is not restricted to the treatment of distillate lubricating oil fractions since the solvent may be adapted to the refining and purification of either distillate or residual fractions of mineral lubricating oil, and may be adapted to the treatment of petroleum fractions other than lubricating oil fractions, as, for example, naphtha and kerosene.

Although specific reference has been made to the use of beta compounds, it is contemplated that the alpha form of compounds may also be used.

Obviously, many modifications and variations of the invention, as hereinbefore set forth, may be made without departing from the spirit and scope thereof, and therefore only such limitations should be imposed as are indicated in the appended claims.

I claim:

1. The method of separating hydrocarbon oil containing high viscosity and low viscosity index constituents into fractions respectively rich in high viscosity index and low viscosity index constituents, which comprises mixing the oil with a solvent selected from the group consisting of methoxy methyl acetate, ethoxy methyl acetate, beta methoxy ethyl acetate, and beta ethoxy ethyl acetate, forming an extract phase containing low viscosity index constituents dissolved in the solvent liquid, and a raffinate phase comprising relatively high viscosity index constituents, and separating the two phases.

2. The method of separating hydrocarbon oil containing high viscosity index and low viscosity index constituents into fractions respectively rich in high viscosity index and low viscosity index constituents, comprising mixing with the oil a solvent liquid comprising a compound having the structural formula:

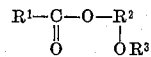

where $R^1$, $R^2$ and $R^3$ represent an alkyl radical selected from the group consisting of methyl, ethyl and propyl, forming an extract phase containing low viscosity index constituents dissolved in the solvent liquid and a raffinate phase comprising relatively high viscosity index constituents, and separating the two phases.

LOUIS A. CLARKE.